United States Patent
Amundsen et al.

(10) Patent No.: US 12,510,994 B2
(45) Date of Patent: Dec. 30, 2025

(54) RESOURCE ALLOCATION APPARATUS AND METHOD

(71) Applicant: TouchNetix AS, Trondheim (NO)

(72) Inventors: Kai Kristian Amundsen, Trondheim (NO); Trond Jarle Pedersen, Trondheim (NO)

(73) Assignee: TouchNetix AS, Trondheim (NO)

( * ) Notice: Subject to any disclaimer, the term of this patent is extended or adjusted under 35 U.S.C. 154(b) by 118 days.

(21) Appl. No.: 18/551,960

(22) PCT Filed: Mar. 22, 2022

(86) PCT No.: PCT/EP2022/057507
§ 371 (c)(1),
(2) Date: Sep. 22, 2023

(87) PCT Pub. No.: WO2022/200358
PCT Pub. Date: Sep. 29, 2022

(65) Prior Publication Data
US 2024/0160316 A1 May 16, 2024

(30) Foreign Application Priority Data
Mar. 24, 2021 (GB) .................... 2104120

(51) Int. Cl.
*G06F 3/041* (2006.01)
*G06F 3/044* (2006.01)
*G06F 9/50* (2006.01)

(52) U.S. Cl.
CPC ........ *G06F 3/04166* (2019.05); *G06F 3/0446* (2019.05); *G06F 9/5005* (2013.01)

(58) Field of Classification Search
CPC combination set(s) only.
See application file for complete search history.

(56) References Cited

U.S. PATENT DOCUMENTS

2015/0130761 A1* 5/2015 Hong .................... G06F 9/5005
345/174
2016/0195988 A1 7/2016 Fu
(Continued)

FOREIGN PATENT DOCUMENTS

JP 2002163117 A 6/2002
WO 2005114369 A2 12/2005

OTHER PUBLICATIONS

Combined Search and Examination Report issued by the Intellectual Property Office of Great Britain for priority United Kingdom application No. 2104120.7, issued Dec. 22, 2021.
(Continued)

*Primary Examiner* — William Boddie
*Assistant Examiner* — Alecia D English
(74) *Attorney, Agent, or Firm* — Renner, Otto, Boisselle & Sklar, LLP.

(57) ABSTRACT

A resource allocation controller for a touch-sensitive apparatus, comprising: a timing module for obtaining timing information; a timeslot counter configured to output an indication of a current timeslot of a plurality of timeslots based on the obtained timing information; an allocation module configured to allocate a first resource to one of a first function and a second function during a first timeslot of the plurality of timeslots and to allocate the first resource to the other of the first function and the second function during a second timeslot of the plurality of timeslots; and wherein the resource allocation controller is configured to indicate to a function execution module to which of the first function and the second function the first resource is allocated to during the first timeslot, and to indicate to the function execution module a function to which the first resource is allocated.

17 Claims, 4 Drawing Sheets

(56) References Cited

U.S. PATENT DOCUMENTS

2019/0102003 A1     4/2019   Gur
2021/0345361 A1*   11/2021   Hisano .................. G06F 3/0383

OTHER PUBLICATIONS

International Search Report and Written Opinion issued for priority International Application No. PCT/EP2022/057507, mailed Jun. 17, 2022.

* cited by examiner

RESOURCE ALLOCATION APPARATUS AND METHOD

This application is a national phase of International Application No. PCT/EP2022/057507 filed Mar. 22, 2022, which claims priority to United Kingdom Application No. 202104120.7 filed Mar. 24, 2021, each of which is hereby incorporated herein by reference in its entirety.

FIELD

The present disclosure relates to the field of touch-sensitive apparatuses, and more specifically to the allocation of available resources of the touch-sensitive apparatuses during use.

BACKGROUND OF THE INVENTION

A capacitive touch sensor can be generalised as one that uses a physical sensor element comprising an arrangement of electrically conductive electrodes extending over a touch sensitive area (sensing area) to define sensor nodes (or intersection points) and controller circuitry connected to the electrodes and operable to measure changes in the electrical capacitance of each of the electrodes or the mutual-capacitance between combinations of the electrodes. The changes in electrical capacitance can be used to indicate the presence of a touch (or more generally a conductive object) on or in proximity to the touch sensitive area. The electrodes are typically provided on a substrate.

For capacitive touch sensors, particularly those with a high resolution (i.e., a large number of electrodes and/or intersection points), many measurements may need to be performed. For instance, when the mutual capacitance is measured between combinations of electrodes, to perform a complete scan of the mutual capacitance over the touch sensitive surface, each intersection (or combination) of electrodes must be individually measured.

Hence, in certain applications, a greater number of components (resources) are required in controllers to enable the measurements of capacitive touch screens, which can increase the cost of manufacturing said controllers and the space required to fit the controllers in touch sensitive apparatuses having said controllers (or in other words, the physical footprint of the controller).

There is therefore a desire to provide controllers for capacitive touch sensors that have reduced cost and size.

SUMMARY OF THE INVENTION

According to a first aspect of the invention there is provided a resource allocation controller for a touch-sensitive apparatus, the resource allocation controller comprising: a timing module for obtaining timing information; a timeslot counter configured to output an indication of a current timeslot of a plurality of timeslots based on the obtained timing information; an allocation module configured to allocate a first resource to one of a first function and a second function during a first timeslot of the plurality of timeslots and to allocate the first resource to the other of the first function and the second function during a second timeslot of the plurality of timeslots; wherein the resource allocation controller is configured to indicate to a function execution module to which of the first function and the second function the first resource is allocated to during the first timeslot, and to indicate to the function execution module to which of the first function and the second function the first resource is allocated to during the second timeslot.

According to a second aspect of the invention there is provided a system comprising a resource allocation controller and processing circuitry of a touch-sensitive apparatus, wherein the resource allocation controller is communicatively coupled to the processing circuitry of the touch-sensitive apparatus According to a third aspect of the invention there is provided method for allocating resources using a resource allocation controller for a touch-sensitive apparatus, the resource allocation controller comprising a timing module, a timeslot counter, and an allocation module, the method comprising: the timing module obtaining timing information; the timeslot counter outputting an indication of a current timeslot of a plurality of timeslots based on the obtained timing information; the allocation module allocating a first resource to one of a first function and a second function during a first timeslot of the plurality of timeslots and to allocate the first resource to the other of the first function and the second function during a second timeslot of the plurality of timeslots; and the resource allocation controller indicating to a function execution module to which of the first function and the second function the first resource is allocated to during the first timeslot, and indicating to the function execution module to which of the first function and the second function the first resource is allocated to during the second timeslot.

According to a third aspect of the invention there is provided a computer readable medium having instructions stored thereon that, when executed by a one or more processors, cause the one or more processors to perform a method in accordance with the third aspect of the invention.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Broadly speaking, the present disclosure relates to a resource allocation controller which allocates resources (e.g.

components) for executing a number of different functions. In particular, the disclosure relates to resource allocation controllers for use in a touch sensor for overlaying a display screen to provide a touch-sensitive display (touch screen). More specifically, the present disclosure provides a resource allocation controller which is able to allocate resources to different functions at different times (or in other words, during different timeslots) and to enable those functions to use those resources which they have been assigned. Advantageously this allows the resource allocation controller to share resources between different functions, thereby reducing the total number of resources required. For example, rather than each function requiring a separate set of one or more resources to operate, multiple functions requiring a resource having particular functionality (e.g. able to perform a particular operation) can share a resource having that functionality. Moreover, sharing resources at different times of operation can enable certain functions to be performed in parallel, meaning that any increase in time associated with sharing resources can be reduced with performing different functions in parallel.

Figure 1:
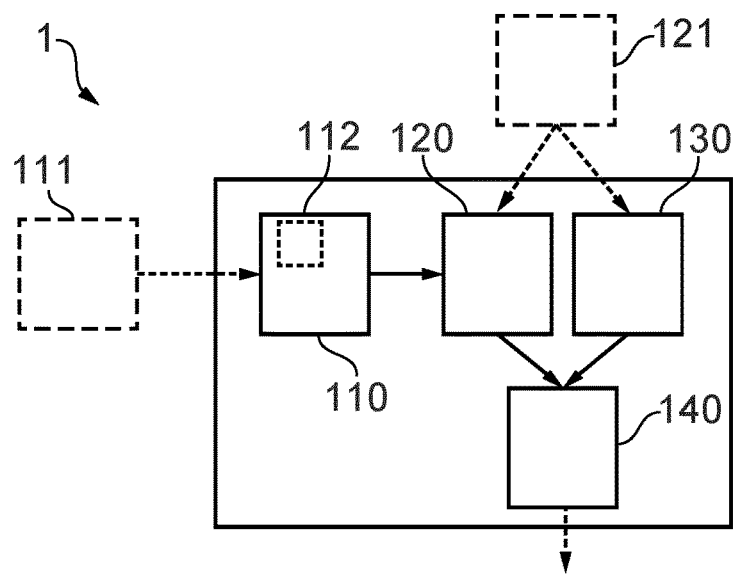
FIG. 1 schematically illustrates a resource allocation controller for a touch-sensitive apparatus in accordance with the certain embodiments of the invention.

FIG. 1 schematically shows a resource allocation controller 1 for a touch-sensitive apparatus in accordance with the principals of the present disclosure. The touch-sensitive apparatus 1 is represented in plan view.

The resource allocation controller 1 of FIG. 1 comprises a timing module 110, a timeslot counter 120, an allocation module 130, and an output module 140. In some examples, the resource allocation controller 1 comprises further components such as a function execution module. In some examples, each of the components of the resource allocation controller 1, and optionally the function execution module, are provided as a single component (e.g. on a printed circuit board). In some other examples one or more of the components of the resource allocation controller 1 are provided as separated components (e.g. separate printed circuit boards), but are electronically connected to the other components. In some examples, the resource allocation controller 1 is provided in software executing on one or more processors.

The controller 1, in some implementations, may form part of or be integrated with control unit (or control circuitry or control element) of a touch sensitive apparatus; for example, the controller 1 may be integrally formed with the control unit and formed from a single PCB.

The timing module 110 is configured to obtain timing information. The timing information may be obtained from either an external timing source 111 or from an internal timing source 112. An external timing source 111 is a source of timing information external to the resource allocation controller. For example, an external timing source 111 may be a clock separate from the controller 1 (e.g., the clock may be part of the control unit of the touch sensitive apparatus). An internal timing source 112 is a source of timing information internal to resource allocation controller. For example, an internal timing source 112 may be an internal clock of, or kernel accessible by, the timing module 110. The external timing source 111 and internal timing source 112 are shown in dashed lines in FIG. 1 emphasizing that one or the other may be present. The external timing source 111 and internal timing source 112 may utilise a clock cycle of a (micro)processor or the like either external to or internal to the timing module 110, such that the time may be measured based on the number of clock cycles of the processor. The clock cycle may be on the order of 32 MHz, although other frequencies may be used in accordance with the present disclosure. Alternatively, any other suitable unit of time may be used, such as seconds.

The timeslot counter 120 controls switching between a plurality of timeslots. By timeslot it is meant a period, window or portion of time. By switching it is meant the timeslot counter 120 identifies or determines which timeslot of the plurality of time slots is the current timeslot based on the timing information obtained by the timing module 110. In some examples, the timeslot counter 120 determines when a particular time slot has elapsed (e.g. based on the start time and duration of the timeslot) and switches or changes to the next timeslot. In some other examples, the timeslot counter 120 compares the current time to a queue or list of timeslots to determine which is the current timeslot. In accordance with the above, the timeslot counter 120 is configured to output an indication of the current timeslot of the plurality of timeslots based on the obtained timing information. By an indication, it is meant information identifying a current timeslot. For example, timeslots may be labelled or otherwise identified, and an identification of the current timeslot may include an indication of the label assigned to the timeslot.

In some examples, the duration of each timeslot is equal (i.e. of the same length). In some other examples, the duration of at least one timeslot is unequal (i.e. not of the same length) in comparison to the other timeslots. In some examples, the duration of the timeslots (whether equal or unequal) may be fixed, for example, upon manufacture of the controller 1.

In some other examples, the duration of each timeslot is configurable (i.e. alterable or changeable). For example, a first timeslot can be configured or altered independently of a second timeslot of the plurality of timeslots. In some of these examples information relating to the duration or configuration of each timeslot may be provided from a further processor. In some of these examples, a user may be able to configure the duration of the timeslots, for example via the further processor 121 in communication with a user interface through which the user can interact with the resource allocation controller 1 and the components thereof. In some others of these examples, the controller 1 is configured to automatically alter (i.e. without user intervention) the duration of the timeslots.

In some examples, the configuration of the duration of a timeslot is based on at least one selected from the group comprising a historical usage time of at least one resource, a predicted usage time of at least one resource, and a user-defined duration or preference.

In some of these examples the configuration of the duration of a timeslot is based on scheduling information from an external source (e.g. an external source providing a user-defined duration or preference of resource), while in others of these examples, the duration of timeslots will be configured based on information determined or calculated by the resource allocation controller 1 itself or by the control unit of the touch-sensitive apparatus. As such, in some examples, the timeslot counter 120 can be configured to receive timeslot configuration information from the further processor 121 (e.g. a further processor which may be part of or in communication with a user information device). By timeslot configuration information, it is meant information which is used by the timeslot counter 120 to configure either directly or indirectly (e.g. by performing further calculations) at least one timeslot of the plurality of timeslots.

In some examples, the timeslot counter 120 can configure the duration of one or more timeslots based on a historical usage time of at least one resource by measuring the amount of time that a resource is used (e.g. to perform a single or integer number of operations) and basing the configured duration on the determined amount of time. For example, the timeslot counter 120 may determine a mean and a standard deviation for the amount of time an operation using a resource takes and may configure the timeslot to be larger than the mean time (e.g. 1 standard deviation higher than the mean time) such that most operations complete successfully within the time slot, with reduced downtime (e.g. time in which the resource is not utilised) before the next timeslot. The mean or average time may be based on a rolling window of measurements or on measurements obtained over the course of use of the resource allocation controller 1.

The timeslot counter 120 can configure the duration of one or more timeslots based on a predicted usage time of at least one resource by, for example, analysing trends in the usage of functions and resources and predicting future usage. For example, the timeslot counter 120 may determine, or be provided with, information (e.g. from a further processor 121) indicating an increased use of a function and may identify that said function typically requires a timeslot of a length X to efficiently operate. The timeslot counter 120 may configure the duration based on the information.

The timeslot counter 120 can configure the duration of one or more timeslots based on a user-defined duration or preference received as configuration information from a further processor 121. For example the external source may be a user interface, which the user can interact with to provide an input. By a user-defined duration, it is meant that the user sets a value defining the duration of one or more timeslots. By a user preference it is meant that a user provides a preference for a certain type of performance characteristic, and the duration of the timeslot is configured in response to said preference. For example, the preference may be for "short" or "long" timeslot durations, or may be a preference for "performance" or "low power". Alternatively, the preference may be to prioritise one or more functions. The timeslot counter can configure one or more timeslots to have durations advantageous to the efficient operation of the prioritised functions.

The allocation module 130 is configured to allocate resources to functions. By allocate, it is meant that the function will be provided with control of or otherwise enabled to use the resources to which it is assigned. The functions themselves may be executed by the function execution module (not shown); for example, the function execution module may send control signals to the resources allocated to the first function to cause the allocated resources to operate in accordance with the first function. The functions may be thought of as certain functions that the touch-sensitive apparatus may implement, such as applying an electrical signal to an electrode of the electrode array of the touch sensitive apparatus, or receiving an electrical signal from the electrode array, etc.

The allocation module 130 is configured to allocate resources to functions within one or more timeslots of the plurality of timeslots. The allocation module 130 can allocate resources to one function within one or more timeslots and to a different function within one or more other timeslots. For example, the allocation module 130 is configured to allocate a first resource to one of a first function and a second function during a first timeslot of the plurality of timeslots and to allocate the first resource to the other of the first function and the second function during a second timeslot of the plurality of timeslots. While in the example above there are two functions, in some examples there may be more than one resource and/or more than two functions. Additionally, a resource cannot be allocated to more than one function in a single timeslot.

It will be appreciated that the terms 'first' and 'second' are used merely as labels to easily distinguish between different features of the same or a similar type. The terms 'first' and 'second' are not meant to indicate an ordering of the features. For example, the "second timeslot" does not necessarily follow sequentially after the "first timeslot".

In some examples, the allocation module 130 is configured to allocate resources to functions (e.g. the first resource to either the first function or the second function for each of the plurality of timeslots) based on any of at least one selected from the group comprising usage requirements of functions, usage history of functions, predicted usage of functions, a user-defined allocation of the resource, and a user preference.

The allocation module 130 may allocate resources to functions based on usage requirements of functions (e.g. a first function and a second function) by determining the usage requirements of each function and allocating resources based on requirements of each function. For example, a first function requiring certain resources can be allocated those resources in a first time slot, and a second function requiring at least one of the same resources will not be assigned any resources in the first timeslot as the second function may be unable to operate without all of the required resources. The second function will instead be assigned the resources it requires in a different time slot (e.g. a second time slot). The allocation module may employ an algorithm (e.g. a sorting algorithm) to assign resources to functions in the plurality of timeslots in an efficient manner.

Alternatively or additionally, the allocation module 130 can allocate resources to functions based on the usage history of functions (e.g. a first function and a second function) by recording the usage history or accessing a record of the usage history, and allocating resources based on the amount of usage a particular function has had. For example the allocation module may determine that a second function may complete within half the allocated time slot (that is, the resources are unused for half the time slot), and may as a result allocate resources to the first function in twice as many timeslots as the allocation module allocates resources to the second function to make more effective use of the processing time. Alternatively, rather than allocating more timeslots, the allocation module 130 can configure timeslots allocated to the first function to have a greater duration than those allocated to the second function.

Alternatively or additionally, the allocation module 130 can allocate resources to functions based on predicted usage of functions (e.g. a first function and a second function) by receiving one or more indicators relating to increased or decreased usage of one or more of the functions. For example the allocation module can predict that there will be increased demand for the execution of a first function in response to receiving an indicator. For example the indicator may indicate that a device or interface associated with the controller 1 or particular function has switched from a low power or standby mode to a high power or on mode, or from a mutual capacitance measurement mode to a self-capacitance measurement mode.

Alternatively or additionally, the allocation module 130 can allocate resources to functions based on a user-defined allocation of the resource by receiving a user-defined allocation listing the allocation of resources to functions for a plurality of timeslots, and allocating resources to functions in accordance with the user-defined allocation. It will be appreciated that the user-defined allocation of resources to functions may be done in conjunction with a user-defined duration or preference for the duration of one or more timeslots.

The allocation module 130 can allocate resources to functions based on a user preference by allocating resources based on the preference indicated by the user. For example, if the user prioritizes one or more functions, then those functions can be allocated a greater share of resources and/or allocated those resources in a greater number of timeslots. In some examples the user may indicate a preference for a certain abstract concept (e.g. "performance" or "low power") and the allocation module may determine which functions should be preferentially allocated resources based on the preference.

The output module 140 is configured to receive the indication of the current timeslot of the plurality of timeslots from the timeslot counter 120 and to receive the allocation of resources from the allocation module 130 and to indicate, on behalf of the resource allocation controller 1, to a function execution module to which functions resources have been allocated to during a timeslot (e.g. the current time slot or a next timeslot).

The function execution module (not shown) is configured to receive an indication of which resources have been assigned to which functions in timeslots. For example, the function execution module can receive an indication of which resources have been assigned to which functions in the current time slot and/or in a next timeslot. For example, the function execution module can be configured to receive an indication from the resource allocation controller 1 of which of the first function and the second function the first resource is allocated to during the first timeslot, and to indicate to the function execution module to which of the first function and the second function the first resource is allocated to during the second timeslot.

In some examples, the function execution module is configured to execute functions, and to utilise resources in the execution of these functions in accordance with the allocations set by the allocation module. For example, where the allocation module 130 has allocated a first resource to one of a first function and a second function during a first timeslot of the plurality of timeslots and allocated the first resource to the other of the first function and the second function during a second timeslot of the plurality of timeslots; the function execution module is configured to utilise the first resource when executing the first function during the first time slot and to utilise the first resource when executing the second function during the second timeslot.

In some examples, the function execution module is configured to enable functions to utilise resources that have been allocated to them by the allocation module 130. For example, the function execution module may control a plurality of switches for electrically connecting one or more resources to a function in accordance with the allocation of a respective timeslot. For example, where the allocation module 130 has allocated a first resource to one of a first function and a second function during a first timeslot of the plurality of timeslots and allocated the first resource to the other of the first function and the second function during a second timeslot of the plurality of timeslots; the function execution module is configured to enable the first function to utilise the first resource during the first time slot and to enable the second function to utilise the second resource during the second time slot.

In some examples the resource allocation controller 1 or the function execution module comprise one or more buffers for storing an operation state of an executed function at the end of an allocated timeslot. For example the operation state may be an output of an operation for an executed function which is incomplete at the end of the allocated timeslot. For example, if an operation being performed using a resource by an executed function has not finished within the allocated timeslot (or a plurality of allocated timeslots) and the resource is reallocated to a different function for the next timeslot, the current state of any operations is saved to the one or more buffers. The one or more buffers can be accessed by the function when the function is next allocated the required resource. In some examples, each function has one or more buffers. In some examples, each resource has one or more buffers.

Figure 2:
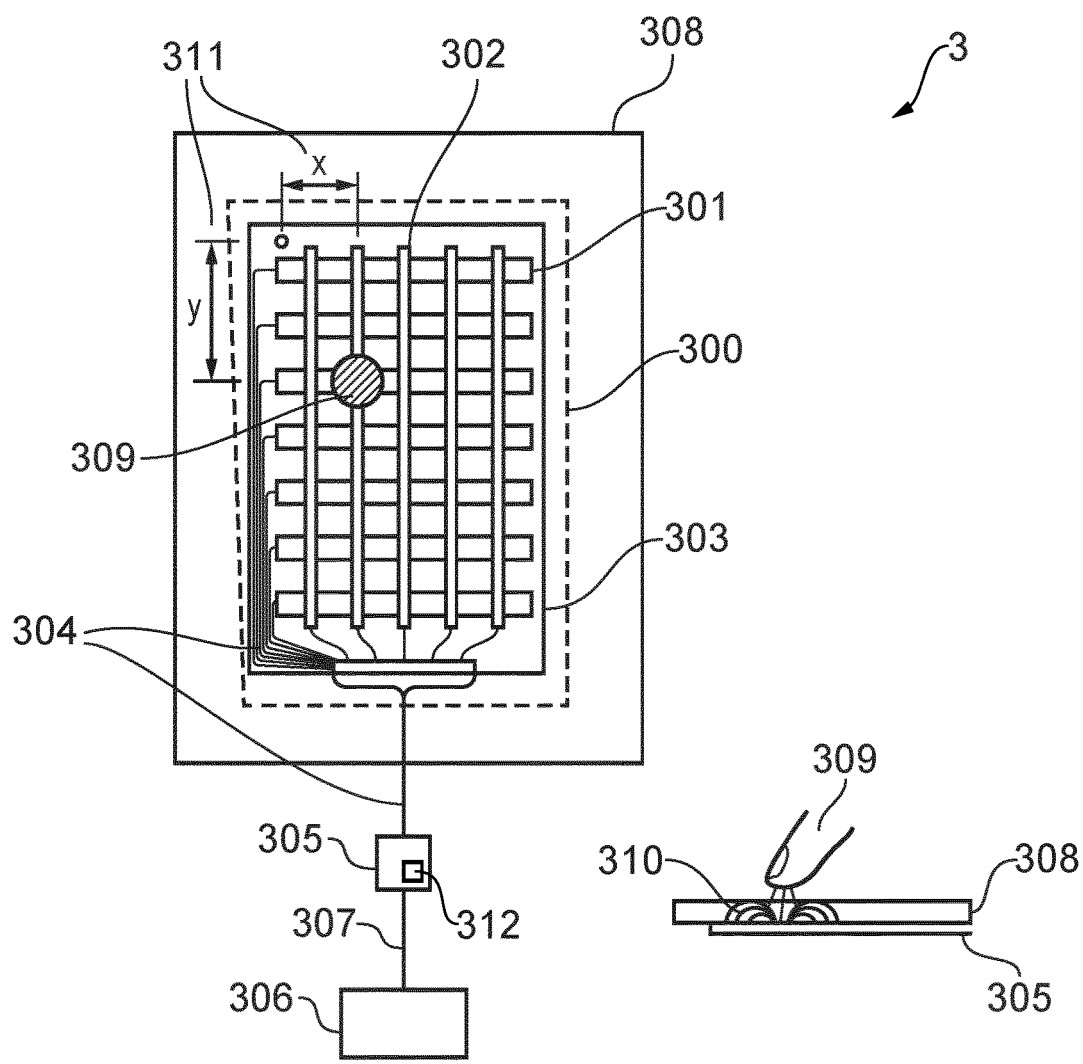
FIG. 2 schematically illustrates a touch sensitive apparatus in accordance with certain embodiments of the invention.

FIG. 2 schematically shows a touch-sensitive apparatus 3 in accordance with the principals of the present disclosure. The touch-sensitive apparatus 3 is represented in plan view (to the left in the figure) and also in cross-sectional view (to the right in the figure).

The touch-sensitive apparatus 3 comprises a sensor element 300, measurement circuitry 305, processing circuitry 306, and cover 308. The sensor element 300 and cover 308 may, more generally be referred to as a touch screen or touch-sensitive element of the touch-sensitive apparatus 3, while the measurement circuitry 305 and processing circuitry 306 may, more generally, be referred to as the controller of the touch-sensitive apparatus 3.

The touch screen is primarily configured for establishing the position of a touch within a two-dimensional sensing area by providing Cartesian coordinates along an X-direction (horizontal in the figure) and a Y-direction (vertical in the figure). In this implementation, the sensor element 300 is constructed from a substrate 303 that could be glass or plastic or some other insulating material and upon which is arranged an array of electrodes consisting of multiple laterally extending parallel electrodes, X-electrodes 301 (row electrodes), and multiple vertically extending parallel electrodes, Y-electrodes 302 (column electrodes), which in combination allow the position of a touch 309 to be determined. To clarify the terminology, and as will be seen from FIG. 1, the X-electrodes 301 (row electrodes) are aligned parallel to the X-direction and the Y-electrodes 302 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 301 and Y-electrodes 302 define a sensing (or sense) area, which is a region of the substrate 303 which is sensitive to touch.

In some cases, each electrode may have a more detailed structure than the simple "bar" structures represented in FIG. 2, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4). Referring back to FIG. 2, the electrodes 301, 302 are electrically connected via circuit conductors 304 to measurement circuitry 305, which is in turn connected to processing circuitry 306 by means of a circuit conductor 307. The measurement circuitry 305 and/or the processing circuitry 306 may each be provided by a (micro)controller, processor, ASIC or similar form of control chip. Although shown separately in FIG. 2, in some implementations, the measurement circuitry and the processing circuitry may be provided by the same (micro)controller, processor, ASIC or similar form of control chip. The measurement circuitry 305 and/or the processing circuitry 306 may be comprised of a printed circuit board (PCB), which may further include the various circuit conductors 304, 307. The measurement circuitry 305 and the processing circuitry 306 may be formed on the same PCB, or separate PCBs. Note also that the functionality provided by either of the measurement circuitry 305 and the processing circuitry 306 may be split across multiple circuit boards and/or across components which are not mounted to a PCB. The processing circuitry 306 interrogates the measurement circuitry 305 to recover the presence and coordinates of any touch or touches present on, or proximate to, the sensor element 300.

Generally speaking, the measurement circuitry 305 is configured to perform capacitance measurements associated with the electrodes 301, 302 (described in more detail below). The measurement circuitry 305 comprises drive circuitry 312 for generating electrical signals for performing the capacitance measurements. The measurement circuitry 305 outputs the capacitance measurements to the processing circuitry 306, which is arranged to perform processing using the capacitance measurements. The processing circuitry 306 may be configured to perform a number of functions, but at the very least is configured to determine when a touch 309, caused by an object such a human finger or a stylus coming into contact with (or being adjacent to) the sense area of the sensor element 300 with appropriate analysis of relative changes in the electrodes' measured capacitance/capacitive coupling. This determination process is described in more detail below. The processing circuitry 306, as in the described implementation, may also be configured to, with appropriate analysis of relative changes in the electrodes' measured capacitance/capacitive coupling, calculate a touch position on the cover's surface as an XY coordinate 311.

In the example, a front cover (also referred to as a lens or panel) 308 is positioned in front of the substrate 303 and a single touch 309 on the surface of the cover 308 is schematically represented. Note that the touch itself does not generally make direct galvanic connection to the sensor 303 or to the electrodes 302. Rather, the touch influences the electric fields 310 that the measurement circuitry 305 generates using the electrodes 302 (described in more detail below).

A further aspect of capacitive touch sensors relates to the way the measurement circuitry 305 uses the electrodes of the sensor element to make its measurements. There are two main techniques for measuring capacitance, both of which are employed by the measurement circuitry 305 of the described implementation. That is to say, the measurement circuitry 305 is configured to determine capacitances of one or more of the electrodes according to both the first technique and the second technique.

Figure 3:
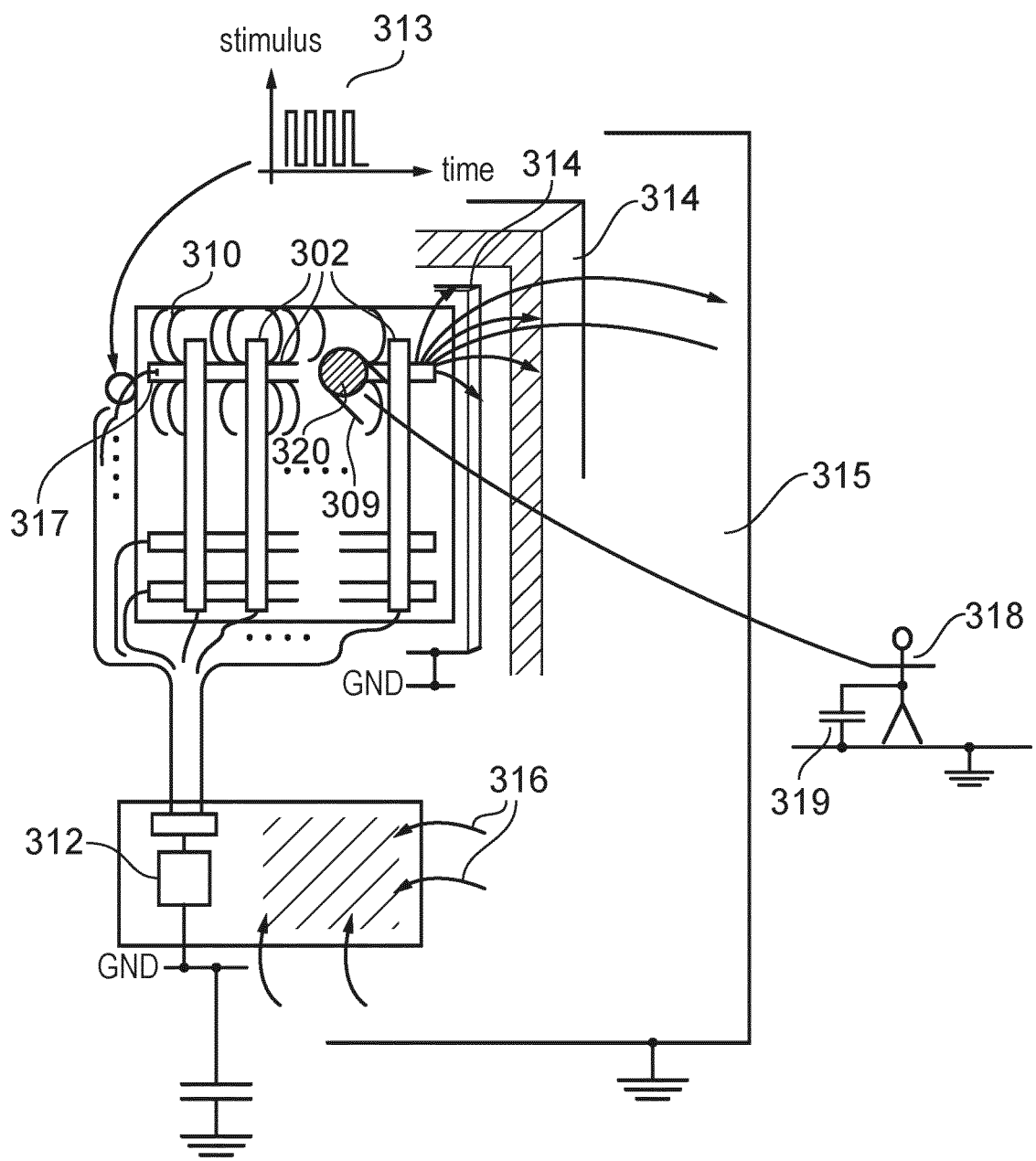
FIG. 3 schematically illustrates a self-capacitance measurement mode of the touch sensitive apparatus, specifically with a view to explaining the principles of self capacitance measurement.

A first technique is based on measuring what is frequently referred to as "self-capacitance". Reference is made to FIG. 3. In FIG. 3, the drive circuitry 312 of the measurement circuitry 305 is configured to generate and apply an electrical stimulus (drive signal) 313 to each electrode 301, 302 which will cause an electric field 310 to form around it. This field 310 couples through the space around the electrode back to the measurement circuitry 305 via numerous conductive return paths that are part of the nearby circuitry of the sensor element 300 and the product housing (shown schematically by reference numeral 314), or physical elements from the nearby surroundings 315 etc., so completing a capacitive circuit 316. The overall sum of return paths is typically referred to as the "free space return path" in an attempt to simplify an otherwise hard-to-visualize electric field distribution. The important point to realise is that the measurement circuitry 305 is only driving each electrode from a single explicit electrical terminal 317; the other terminal is the capacitive connection via this "free space return path". The capacitance measured by the measurement circuitry 305 is the "self-capacitance" of the sensor electrode (and connected tracks) that is being driven relative to free space (or Earth as it is sometimes called) i.e. the "self-capacitance" of the relevant sensor electrode. Touching or approaching the electrode with a conductive element, such as a human finger, causes some of the field to couple via the finger through the connected body 318, through free space and back to the measurement circuitry 305. This extra return path 319 can be relatively strong for large objects (such as the human body), and so can give a stronger coupling of the electrode's field back to the measurement circuitry 305; touching or approaching the electrode hence increases the self-capacitance of the electrode. The measurement circuitry 305 is configured to sense this increase in capacitance. The increase is strongly proportional to the area 320 of the applied touch 309 and is normally weakly proportional to the touching body's size (the latter typically offering quite a strong coupling and therefore not being the dominant term in the sum of series connected capacitances).

In the described implementation, the electrodes 301, 302 are arranged on an orthogonal grid, generally with a first set of electrodes on one side of a substantially insulating substrate 303 and the other set of electrodes on the opposite side of the substrate 303 and oriented at substantially 90° to the first set. In other implementations, the electrodes may be oriented at a different angle (e.g., 30°) relative to one another. In addition, it should also be appreciated that it is also possible to provide structures where the grid of electrodes is formed on a single side of the substrate 303 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

When the measurement circuitry 305 operates in accordance with the self-capacitance measuring mode, the measurement circuitry 305 can either drive each electrode in turn (sequential) with appropriate switching of a single control channel (i.e., via a multiplexer) or it can drive them all in parallel with an appropriate number of separate control channels. In the former sequential case, any neighbouring electrodes to a driven electrode are sometimes grounded by the measurement circuitry 305 to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the measurement circuitry 305 can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the measurement circuitry 305 if there is a voltage difference between the electrodes).

Figure 4:
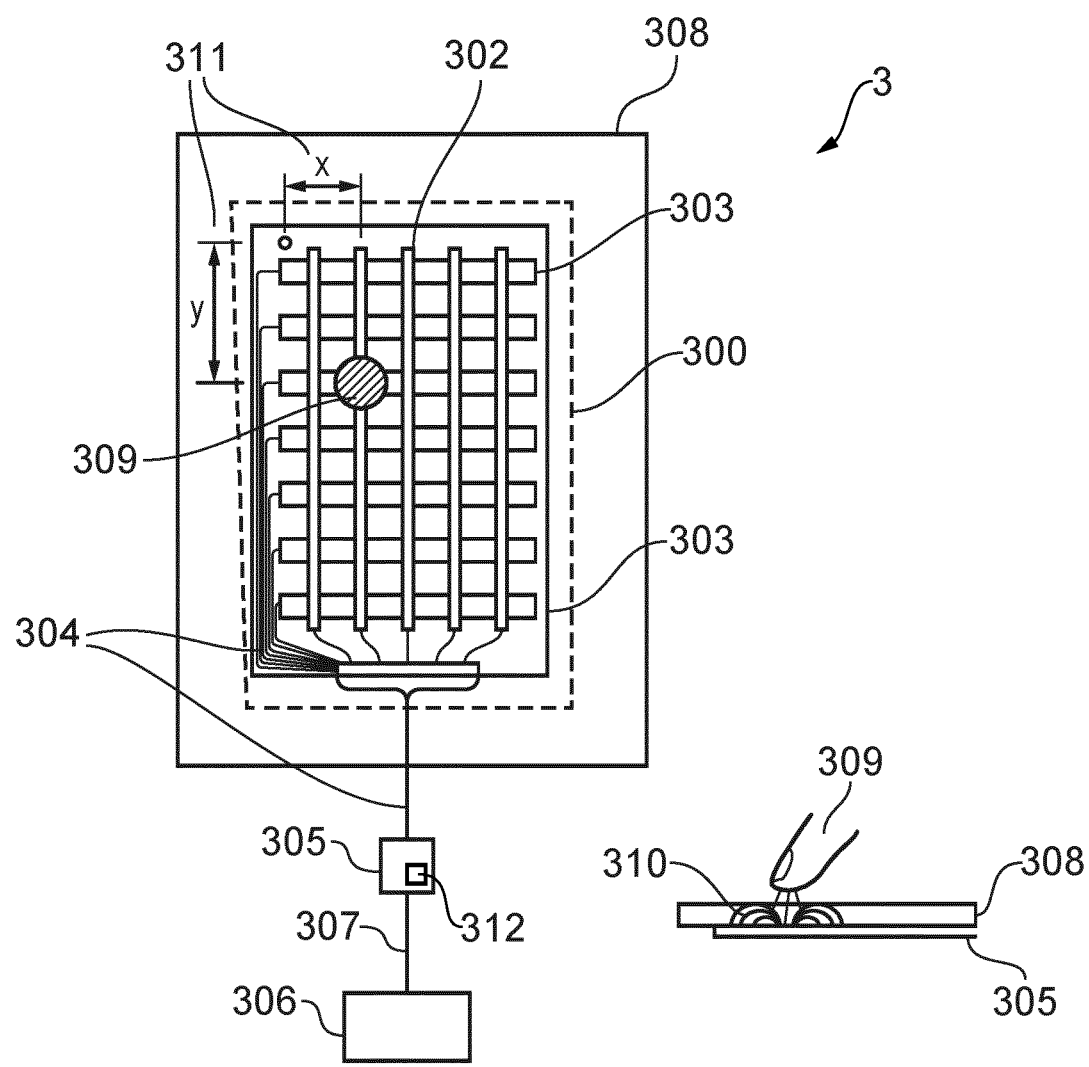
FIG. 4 schematically illustrates a mutual-capacitance measurement mode of the touch sensitive apparatus, specifically with a view to explaining the principles of mutual capacitance measurement.

A second technique is based on measuring what is frequently referred to as "mutual-capacitance". Reference is made to FIG. 4. In FIG. 4, the measurement circuitry 305 will sequentially stimulate each of an array of transmitter (driven/drive) electrodes, shown as the X electrodes 301 in FIG. 4, that are coupled by virtue of their proximity to an array of receiver electrodes, shown as the Y electrodes 302 in FIG. 4. (It should be appreciated that the Y electrodes 302 may instead be the transmitting electrodes and the X electrodes 301 may instead be the receiving electrodes in other implementations). The resulting electric field 310 is now directly coupled from the transmitter to each of the nearby receiver electrodes; the "free space" return path discussed above plays a negligible part in the overall coupling back to the measurement circuitry 305 when the sensor element 300 is not being touched. The area local to and centred on the intersection of a transmitter and a receiver electrode is typically referred to as a "node" or "intersection point". Now, on application or approach of a conductive element such as a human finger, the electric field 310 is partly diverted to the touching object. An extra return path to the measurement circuitry 305 is now established via the body 318 and "free-space" in a similar manner to that described above. However, because this extra return path acts to couple the diverted field directly to the measurement circuitry 305, the amount of field coupled to the nearby receiver electrode 302 decreases. This is measured by the measurement circuitry 305 as a decrease in the "mutual-capacitance" between that particular transmitter electrode and receiver electrodes in the vicinity of the touch 309. The measurement circuitry 305 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 300. The magnitude of a capacitance change is nominally proportional to the area 320 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

As described above, the transmitter electrodes and receiver electrodes in the described implementation are arranged as an orthogonal grid, with the transmitter electrodes on one side of a substantially insulating substrate 303 and the receiver electrodes on the opposite side of the substrate 303. This is as schematically shown in FIG. 4. As in FIG. 3, the first set of transmitter electrodes 301 shown on one side of a substantially insulating substrate 303 and the second set of receiver electrodes 302 is arranged at nominally 90° to the transmitter electrodes on the other side of the substrate 303. In other implementations, the electrodes may be oriented at a different angle (e.g., 30°) relative to one another. In addition, other implementations may have structures where the grid is formed on a single side of the substrate and small insulating bridges, or external connections, are used to allow the transmitter and receiver electrodes to be connected in rows and columns without short circuiting.

There are certain advantages and disadvantages associated with both of the two capacitive sensing techniques described above. Mutual capacitance techniques offer the ability to resolve multiple touches at different locations on the touch-sensitive element, while self-capacitance techniques do not, as a matter of course, provide this functionality, self-capacitance techniques generally output a much stronger signal thus increasing the sensitivity of the touch-sensitive element.

Mutual capacitance touch sensors have been favoured in applications where multiple functions are selectable (i.e., able to be input) by a user of the touch screen at any given time, either by assigning different locations on the touch screen to specific function or via gesture recognition, for example. Such arrangements offer more flexible user interaction with the touch screen/software application from a single input surface. However, it has been found that when certain objects, and more specifically galvanically isolated conductive objects, are present on the surface of the touch-sensitive element utilising a mutual capacitance technique, the touch sensor incorrectly interprets the conductive objects as a user's touch. This is because, in accordance with the mutual capacitance technique, the conductive objects on the surface of the touch-sensitive element strongly affect the capacitance between two electrically coupled electrodes.

Figure 5:
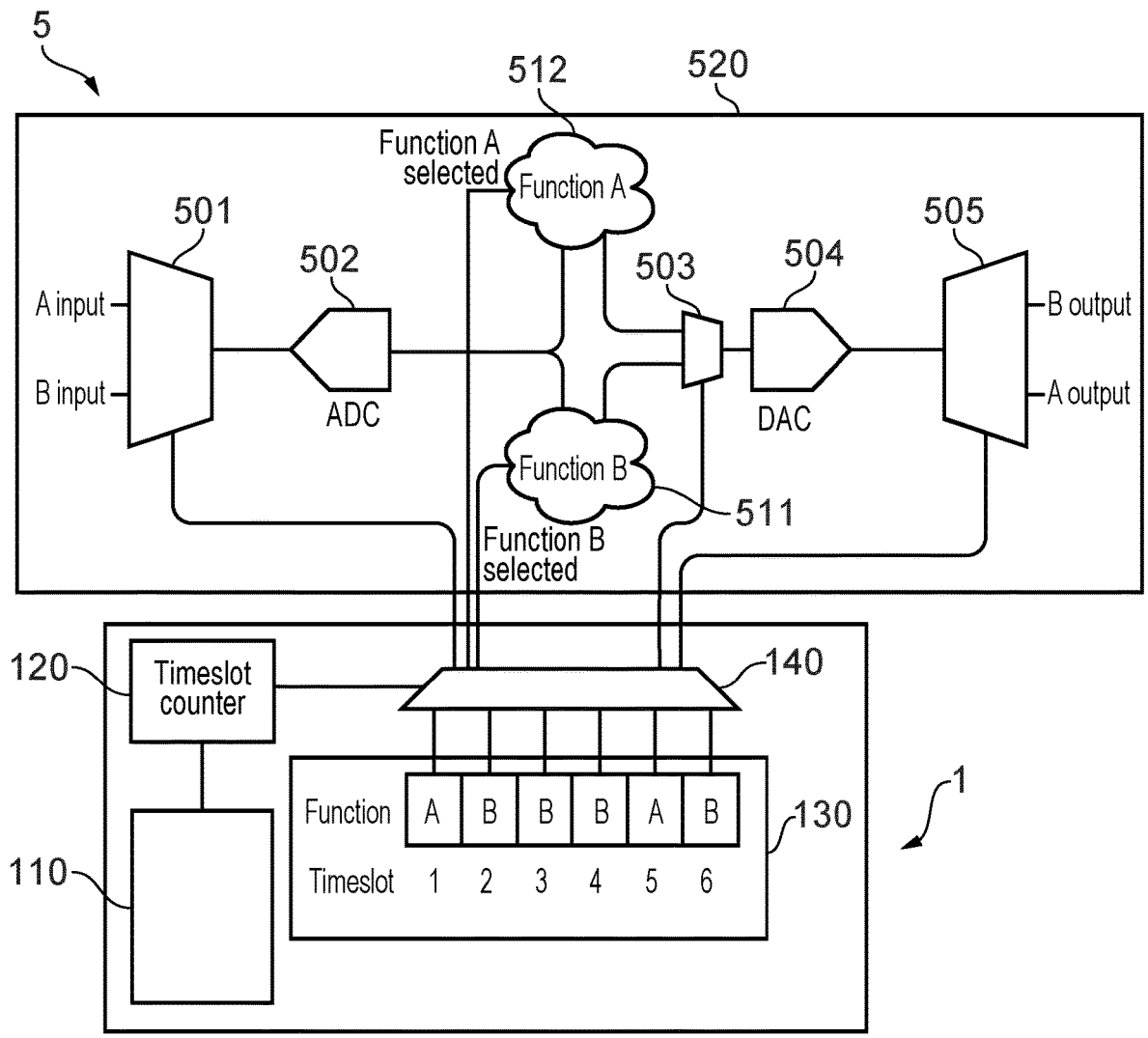
FIG. 5 schematically illustrates a system comprising a resource allocation controller for a touch-sensitive apparatus in accordance with the resource allocation controller of FIG. 1.

FIG. 5 schematically shows a system 5 comprising a resource allocation controller 1 for a touch-sensitive apparatus in accordance with FIG. 1, a plurality of resources 501,502,503,504,505, and a plurality of functions 511, 512. The system 5 is represented in plan view.

In accordance with the resource allocation controller 1 of FIG. 1, the resource allocation controller of FIG. 5 comprises a timing module 110, a timeslot counter 120, an allocation module 130, and output module 140.

FIG. 5 additionally shows a function execution element 520 which comprises the plurality of resources 501,502,503, 504,505 and a plurality of functions 511, 512. The plurality of resources being a plurality of assignable resources. In some examples, the function execution element 520 further comprises one or more non-assignable resources which may be utilised by a respective function, and no other function, in any and/or all timeslots. In the example embodiment of FIG. 5, the function execution module is configured to execute functions, and to utilise resources in the execution of these functions in accordance with the allocations set by the allocation module. It will be appreciated that in an alternative example, the function execution module can be configured to enable functions to utilise resources that have been allocated to them by the allocation module 130. For example, the function execution module may be provided in-between the resource allocation controller 1 and the resources and functions may comprise or otherwise control a plurality of switches for electrically connecting one or more resources to a function in accordance with the allocation of a respective timeslot.

In the example of FIG. 5 the allocation module 130 allocates the plurality of resources 501,502,503,504,505 to one of function A 512 and function B 511 during a particular timeslot and allocates the plurality of resources to the other of the first function and the second function during a second different timeslot. These could be sequential timeslots or non-sequential timeslots. The resource allocation controller 1 is configured to indicate to the function execution module 520, via the output module 140, to which of function A 512 and function B 511 the plurality of resources 501,502,503, 504,505 are allocated to during the first timeslot, and to indicate to the function execution module 1 to which of the first function and the second function the plurality of resources 501,502,503,504,505 are allocated to during the second different timeslot.

The plurality of resources 501,502,503,504,505 as shown in FIG. 5 comprise an analogue-to-digital converter 502, a digital-to-analogue converter 504, two multiplexers 501, 503 and a demultiplexer 505. The multiplexers 501, 503 and the demultiplexer 505 are resources which allow for switching between different inputs or outputs, respectively. For example in the system depicted in FIG. 5, the first multiplexer 501 is configured to receive two inputs and to select a particular input of the two inputs for forwarding to the analogue-to-digital converter 502. The selected input corresponds to an input relating to the function which has control of the multiplexer 501 (e.g. input A or input B).

The plurality of functions 511,512 as shown in FIG. 5 comprise a first function A 512 and a second function B 511. When function A 512 is allocated the resources 501,502, 503,504,505 function A 512 will receive a digital signal from the analogue-to-digital converter 502 which is based on input A (i.e. converted from input A). Function A 512 can then perform any necessary operations and calculations before forwarding an output to the second multiplexer 503. The second multiplexer 503 is configured to receive inputs from both function A 512 and function B 511 and will output whichever of the inputs relates to the function to which the second multiplexer 503 is currently assigned.

The output of the second multiplexer 503 is sent to a digital-to-analogue converter 504 which converts the output from the second multiplexer 503 into an analogue signal. The analogue signal is then received by the demultiplexer 505 which forwards the signal to the appropriate output channel corresponding to the allocated function (i.e. output A).

Alternatively, when Function B is allocated the resources 501,502,503,504,505, an equivalent process is followed. The first multiplexer 501 selects the input corresponding to function B 512 (i.e. input B) for forwarding to the analogue-to-digital converter 502. The analogue-to-digital converter 502 converts the signal and forwards it to function B 511 which perform any necessary operations and calculations before forwarding the output to the second multiplexer 503. The second multiplexer 503 selects the input corresponding to the output of function B 511 and forwards it to the digital-to-analogue converter 504 which converts the output from the second multiplexer 503 into an analogue signal. The analogue signal is then received by the demultiplexer 505 which forwards the signal to the appropriate output channel corresponding to the allocated function (i.e. Output B).

Hence, dependent on the allocation of the resources 501,502,503,504,505, function A 512 and Function B 511 are able to both use the analogue-to-digital converter 502 and digital-to-analogue converter 504 rather than each function requiring a separate analogue-to-digital converter and digital-to-analogue converter for their operation.

In some examples, as exemplified by FIG. 5, the allocation module 130 comprises a table, wherein the allocation of resource to functions corresponding to the plurality of timeslots are stored in the timeslot table. The table shown depicts six timeslots labelled 1 to 6 and an allocation of the resources to one of function A 512 and function B 511. In the example, all of the resources are allocated to a single function during each respective timeslot, in accordance with the table entries.

In some examples, the timeslot counter 120 is configured to increment through the numbered timeslots stored in the table. In some of these examples, the timeslot counter is configured to increment from a start entry of the timeslot table to an end entry of the timeslot table, and to restart at the start entry of the timeslot table after reaching the end entry of the timeslot table. In other words, the timeslot counter 120 is configured to restart at the first timeslot of the timeslot table after the timeslot counter 120 has incremented to the end of the timeslot table, such that the timeslot counter 120 is configured to loop back to the beginning of the allocation table.

It will be appreciated that in other examples, a table having a different number of timeslots is sued. For example, the table may have more than six timeslots. Similarly, in other examples, the table can contain allocations to more than two functions and/or can contain one or more resource groupings, or sets, which can be assigned independently to a different function. Each resource grouping comprises at least one resource of a plurality of resources. It will be appreciated that a table can be constructed that allows for defining the allocation of resources to functions independently of the allocation of other resources to functions.

In some examples, where different resources can be allocated independently of each other the allocation module 130 allocates a first set of resources of a plurality of resources to one of a plurality of functions (e.g. one of function A and function B) during a particular timeslot. The allocation module 130 additionally allocates a different set of resources of the plurality of resources to a different function (e.g. function B where function A was allocated the first set) of the plurality of functions during the particular timeslot. The different set of resource comprises resources that are different to those of the first set of resources. The resource allocation controller 1 is configured to indicate to the function execution module 520, via the output module 140, which function the first set of resources were allocated and to which function the second set of resources were allocated during the particular timeslot.

In some examples resource groupings or sets can change between different timeslots. In these examples, the allocation module allocates a first set of resources of the plurality of resources including a first resource to first function (e.g. one of function A and function B) during a first particular timeslot and allocates a second set of resources of the plurality of resources including the first resource to a second function (e.g. the other of function A and function B) during a second different timeslot. These can be sequential timeslots or non-sequential timeslots. In some examples, the resources other than the first resource can differ between the first and second set. The resource allocation controller is configured to indicate to the function execution module, via the output module, to which function the first set of resources are allocated to during the first timeslot, and to indicate to the function execution module to which function the second set of resources are allocated to during the second different timeslot.

In some examples in accordance with aspects of the present disclosure, such as those of FIGS. 2, 3 and 4, a system comprises a touch sensitive apparatus 3 including processing circuitry 306 which is configured to operate in both a self-capacitance mode, in which the self-capacitance of any given electrode 301 or 302 is measured, and a mutual capacitance mode, in which the mutual capacitance between two spatially intersecting electrodes 301, 302 is measured.

For examples where a self capacitance is measured, a resource allocation controller 1 can be provided in conjunction with, or includes, the processing circuitry 306 to allow resources that are required for measuring the self-capacitance of a first electrode (e.g. electrode 301) to also be used for measuring the self-capacitance of a second electrode (e.g. electrode 302). For example, functions associated with measuring the self-capacitance of the first electrode can be assigned the required resource, or resources, during a first timeslot or plurality of timeslots, and functions associated with measuring the self-capacitance of the second electrode can be assigned the required resource, or resources, during a second timeslot or plurality of timeslots. It will be appreciated that processing circuitry 306 are typically configured to measure a large number of electrodes and as such the resources can be shared across a number of different functions (e.g. more than 2).

For examples where a mutual capacitance is measured, a resource allocation controller 1 can be provided in conjunction with, or includes, the processing circuitry 306 to allow resources that are required for measuring the mutual capacitance between a first pair of electrodes (e.g. electrode 301 and electrode 302) to also be used for measuring the mutual capacitance of a second pair of electrodes. For example, functions associated with measuring the mutual capacitance between the first pair of electrodes can be assigned the required resource, or resources, during a first timeslot or plurality of timeslots, and functions associated with measuring the mutual capacitance between the second pair of electrodes can be assigned the required resource, or resources, during a second timeslot or plurality of timeslots. It will be appreciated that processing circuitry 306 are typically configured to measure across a large number of pairs or combinations of electrodes and as such the resources can be shared across a number of different functions (e.g. more than 2).

In some examples, where a self-capacitance mode and a mutual capacitance mode are used to identify genuine touches on the surface of a touch screen and to compensate for the presence of a conductive object on the surface of the touch screen, the processing circuitry 306 can be provided in conjunction with, or includes, a resource allocation controller 1. Such a resource allocation controller 1 is configured to allocate resources during one or more timeslots to allow for operating in a self-capacitance mode, and is configured to allocate resources during one or more other timeslots to allow the processing circuitry to operate in a mutual capacitance mode. Both the self-capacitance and the mutual capacitance mode requiring at least one resource of a same type that can be shared by one or more functions for performing the self-capacitance and mutual capacitance modes. In some of these examples, the resource allocation controller 1 can first allocate a resource or set of resources to be used by one or more functions for the processing circuitry 306 to operate in a self-capacitance mode to identify a genuine touch; and subsequently upon the identification of a genuine touch, the resource allocation controller can allocate the resource or set of resources to be used by one or more functions for the processing circuitry 306 to operate in a mutual capacitance mode to compensate for the presence of a conductive object on the surface of the touch screen.

Figure 6:
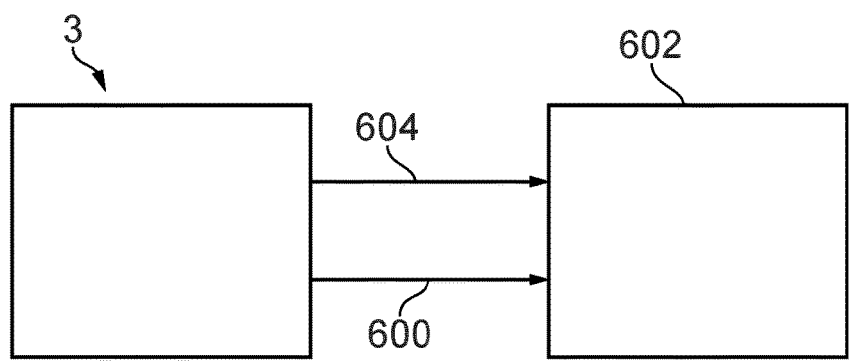
FIG. 6 schematically illustrates an example system which employs the touch sensitive apparatus of FIG. 1 in accordance with certain embodiments of the invention.

FIG. 6 is a highly schematic diagram showing the touch sensitive apparatus 3 coupled to an associated apparatus 602. The associated apparatus 602 generally comprises a computer processor which is capable of running a software application, and may also comprise a display element, such as an LCD screen or the like. In some implementations, the touch sensitive apparatus 3 is integrally formed with the associated apparatus 602, whereas in other implementations the touch sensitive apparatus 3 is able to be coupled to the associated apparatus 602 e.g., via electrical cabling. As described above, in some instances the substrate 303 and cover 308 of the touch sensitive apparatus 3 are transparent and a display element is placed behind the substrate 303 and cover 308, such as in a smartphone.

The touch sensitive apparatus 3 functions as an input mechanism for the associated apparatus 602. As mentioned, the processing circuitry 306 outputs a signal 600 indicating the presence of a touch on the touch-sensitive element to the processing circuitry of the associated apparatus (not shown). In some applications, signal 600 may simply indicate whether or not a genuine touch has been detected on the touch-sensitive element, whereas in other instances, the signal 600 may indicate one or more positions of the touch or touches on the touch-sensitive element, for example as X, Y coordinates (corresponding to the intersection points). The processing circuitry of the associated apparatus 602 may process the signal 600 in accordance with the application being run on the associated apparatus, e.g., by causing the associated apparatus to perform an action or change the image(s) that is displayed on the display unit.

Thus, the present disclosure relates to a resource allocation controller 1 that can be used in a touch-sensitive apparatus 3 in which the resource allocation controller 1 is configured to allocated resources to a plurality of functions that are used in the operation of the touch sensitive apparatus 3, thereby reducing the number of components required to perform any required functions for the operation of the touch sensitive apparatus 3.

Thus there has been described a resource allocation controller for a touch-sensitive apparatus, the resource allocation controller comprising: a timing module for obtaining timing information; a timeslot counter configured to output an indication of a current timeslot of a plurality of timeslots based on the obtained timing information; an allocation module configured to allocate a first resource to one of a first function and a second function during a first timeslot of the plurality of timeslots and to allocate the first resource to the other of the first function and the second function during a second timeslot of the plurality of timeslots; and wherein the resource allocation controller is configured to indicate to a function execution module to which of the first function and the second function the first resource is allocated to during the first timeslot, and to indicate to the function execution module to which of the first function and the second function the first resource is allocated to during the second timeslot.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A resource allocation controller for a touch-sensitive apparatus, the resource allocation controller comprising:
   a timing module for obtaining timing information;
   a timeslot counter configured to output an indication of a current timeslot of a plurality of timeslots based on the obtained timing information;
   an allocation module configured to allocate a first resource to one of a first function and a second function during a first timeslot of the plurality of timeslots and to allocate the first resource to the other of the first function and the second function during a second timeslot of the plurality of timeslots; and
   wherein the resource allocation controller is configured to indicate to a function execution module to which of the first function and the second function the first resource is allocated to during the first timeslot, and to indicate to the function execution module to which of the first function and the second function the first resource is allocated to during the second timeslot,
   wherein the first resource comprises at least one selected from the group comprising an analogue-to-digital converter, a digital-to-analogue converter, a multiplexer, and a demultiplexer.

2. The resource allocation controller of claim 1, wherein the duration of each timeslot of the plurality of timeslots is configurable.

3. The resource allocation controller of claim 2, wherein the duration of each timeslot is configured based on at least one selected from the group comprising a historical usage time of at least one resource, a predicted usage time of at least one resource, and a user-defined duration or preference.

4. The resource allocation controller of claim 1, wherein the timeslot counter is configured to refer to a timeslot table for outputting an indication of the current timeslot.

5. The resource allocation controller of claim 4, wherein the timeslot counter is configured to increment from a start entry of the timeslot table to an end entry of the timeslot table, and to restart at the start entry of the timeslot table after reaching the end entry of the timeslot table.

6. The resource allocation controller of claim 1, wherein the resource allocation controller comprises the function execution module and the function execution module is configured to utilise the first resource when executing the first function during the first time slot and to utilise the first resource when executing the second function during the second timeslot.

7. The resource allocation controller of claim 1, wherein the resource allocation controller comprises the function execution module and the function execution module is configured to enable the first function to utilise the first resource during the first time slot and to enable the second function to utilise the second resource during the second time slot.

8. The resource allocation controller of claim 1, wherein the allocation module is configured to allocate the first resource to either the first function or the second function for each of the plurality of timeslots based on any of at least one selected from the group comprising usage requirements of the first function and the second function, usage history of the first function and the second function, predicted usage of the first function and the second function, a user-defined allocation of the resource, and a user preference.

9. The resource allocation controller of claim 1, wherein the allocation module is configured to allocate a plurality of resources including the first resource.

10. The resource allocation controller of claim 9, wherein the allocation module is configured to allocate the plurality of resources to one of the first function and the second function during the first timeslot, and to allocate the plurality of resources to the other of the first function and the second function during the second timeslot; and
    wherein the resource allocation controller is configured to indicate to the function execution module to which of the first function and the second function the plurality of resources are allocated to during the first timeslot, and to indicate to the function execution module to which of the first function and the second function the plurality of resources are allocated to during the second timeslot.

11. The resource allocation controller of claim 9, wherein the allocation module is configured to allocate a first set of resources of the plurality of resources including the first resource to one of the first function and the second function during the first timeslot, and to allocate a second set of resources of the plurality of resources including the first resource to the other of the first function and the second function during the second timeslot; and
    wherein the resource allocation controller is configured to indicate to the function execution module to which of the first function and the second function the first set of resources is allocated to during the first timeslot, and to indicate to the function execution module to which of the first function and the second function the second set of resources is allocated to during the second timeslot.

12. The resource allocation controller of claim 11, wherein the first set of resources and the second set of resources are the same.

13. The resource allocation controller of claim 11, wherein the allocation module is configured to allocate a third set of resources of the plurality of resources to the other of the first function and the second function during the first timeslot, wherein the third set of resource comprises resources that are different to those of the first set of resources;
    wherein the resource allocation controller is configured to indicate to the function execution module to which of the first function and the second function the third set of resources is allocated to during the first timeslot.

14. The resource allocation controller of claim 1, wherein the resource allocation controller comprise one or more buffers for storing an operation state of an executed function at the end of an allocated timeslot.

15. A system comprising the resource allocation controller of claim 1 and processing circuitry of a touch-sensitive apparatus, wherein the resource allocation controller is communicatively coupled to the processing circuitry of the touch-sensitive apparatus.

16. A method for allocating resources using a resource allocation controller for a touch-sensitive apparatus, the resource allocation controller comprising a timing module, a timeslot counter, and an allocation module, the method comprising:
    the timing module obtaining timing information;
    the timeslot counter outputting an indication of a current timeslot of a plurality of timeslots based on the obtained timing information;
    the allocation module allocating a first resource to one of a first function and a second function during a first timeslot of the plurality of timeslots and to allocate the first resource to the other of the first function and the second function during a second timeslot of the plurality of timeslots; and the resource allocation controller indicating to a function execution module to which of the first function and the second function the first resource is allocated to during the first timeslot, and indicating to the function execution module to which of the first function and the second function the first resource is allocated to during the second timeslot, wherein the first resource comprises at least one selected from the group comprising an analogue-to-digital converter, a digital-to-analogue converter, a multiplexer, and a demultiplexer.

17. A computer readable medium having instructions stored thereon that, when executed by a one or more processors, cause the one or more processors to perform the method of claim 16.

* * * * *